United States Patent [19]

Anselm

[11] Patent Number: 4,947,907
[45] Date of Patent: Aug. 14, 1990

[54] BALANCING OF TOOLING FOR A WOOD LATHE

[76] Inventor: Kenneth R. Anselm, Rt. #1, Box 162, La Center, Ky. 42056

[21] Appl. No.: 322,192

[22] Filed: Mar. 9, 1989

[51] Int. Cl.⁵ .................... B27G 13/08; F16F 15/22; B23C 5/12; F16C 3/22
[52] U.S. Cl. ...................... 144/224; 51/169; 74/573 R; 82/903; 142/22; 407/43; 409/141; 464/180
[58] Field of Search .......... 144/224; 51/169; 82/903; 142/22, 28, 37, 39, 40, 41; 74/573 R; 464/180; 279/83; 407/12, 33, 43, 51; 408/239 R, 239 A; 409/141, 199, 204, 234, 236

[56] References Cited

U.S. PATENT DOCUMENTS

| | | | |
|---|---|---|---|
| 68,876 | 9/1867 | Herrinton | 74/573 |
| 1,072,930 | 9/1913 | Ensign | 144/224 |
| 1,130,210 | 3/1915 | Spence | 51/169 |
| 1,222,783 | 4/1917 | Mattison | 144/224 |
| 1,313,039 | 8/1919 | Akimoff | 51/169 |
| 1,497,735 | 6/1924 | Richardson | 51/169 |
| 1,710,097 | 4/1929 | Mattison | 144/224 |
| 2,557,659 | 6/1951 | Ingraham | 74/573 |
| 3,159,050 | 12/1964 | Wilson | 74/573 |

Primary Examiner—William Terrell
Attorney, Agent, or Firm—Cushman, Darby & Cushman

[57] ABSTRACT

A multi-faceted T-slot cylinder for a cutterhead is mounted to a wood lathe arbor using set screws installed in tapped holes which are provided near opposite ends of the cylinder in diametrically opposite faces of the cylinder (rather than in the same face, as is conventional). Static balancing of the cylinder is thereby improved. For fine-tuning, a dynamic balancing collar is mounted on the arbor near the cylinder. This collar has a plurality of tapped holes provided radially therethrough around its circumference. As the arbor is turned slowly, if measurement shows eccentricity in rotation, the high side is determined and a set screw tightened against the arbor in the respective tapped hole. This dynamic balancing can be done before or after the cutterhead is installed on the arbor, and the dynamic balancer can be used in combination with a wholly conventional T-slot cylinder.

2 Claims, 3 Drawing Sheets

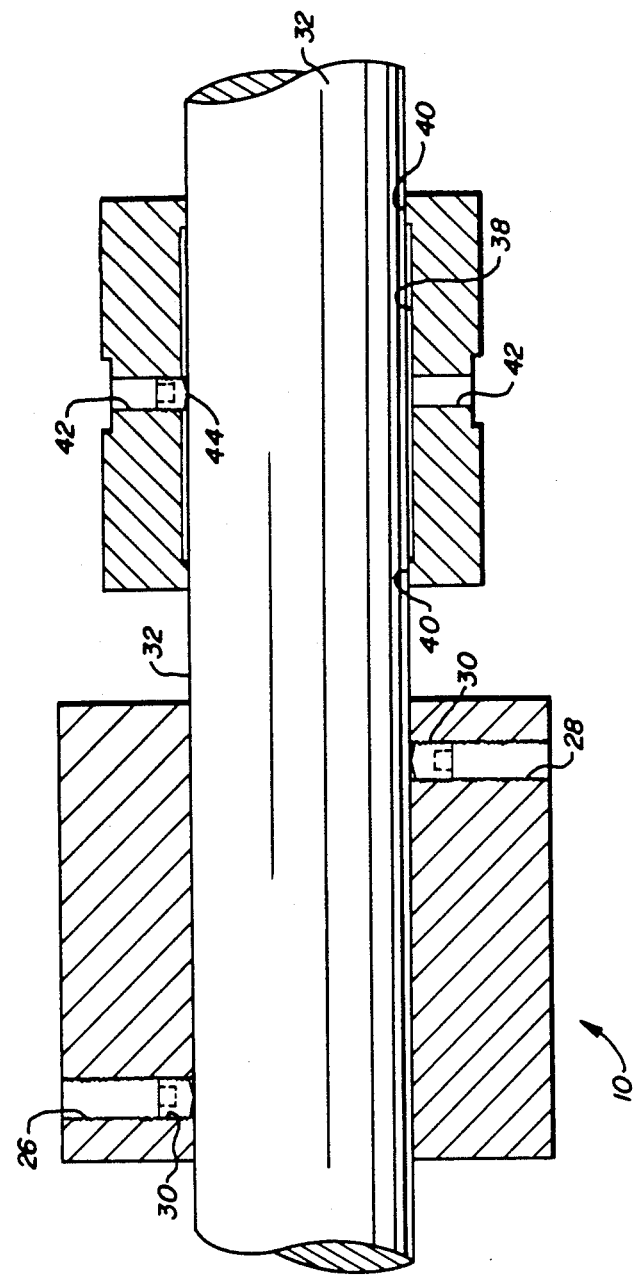

BALANCING OF TOOLING FOR A WOOD LATHE

BACKGROUND OF THE INVENTION

The present invention grew out of the inventor's experience with mass production wood lathes used for turning wood blocks into bedposts, table legs, chair parts, stair parts and similar items.

A long-popular lathe for use in such production is the Mattison No. 57-F, 54" Automatic Shaping Lathe, made by the Mattison Machine Works, of Rockford, IL.

On such a lathe, a cutterhead, or a series of cutterheads, is mounted on an arbor on the lathe and turned at high speed, typically 2700 RPM. The wood block to be turned is clamped between the head stock and tail stock of the lathe and carried into the cutterhead.

Balancing problems which have long faced craftsmen working in the field of setting-up and operating such lathes typically cause 4-6 hour set-up times and lead to overlap problems (when eccentricity results in some knives cutting more than others).

The tooling mounted to an arbor for turning a wood block typically includes at least one cutterhead. Where the length of the part to be turned requires, two or more cutterheads are mounted axially adjacent one another in series on the arbor. Each cutterhead is assembled from a T-slot cylinder (the part which mounts directly on the arbor), knife holders (which mount in the T-slots on the faces of the cylinder), and the knives (which mount to the holders, and do the actual cutting).

A T-slot cylinder typically has six or eight faces (e.g., it is hexagonal or octagonal in transverse cross-sectional shape), is two to fourteen inches long and each face is centrally provided with a longitudinally extending radially outwardly opening T-shaped slot in which, in use, one or more knife-holders is removably mounted. An assembled cutterhead may weigh up to 200 pounds.

Typical T-slot cylinders of the type with which the present invention is concerned, are shown in the U.S. Pat. No. of M.W. Mattison, 1,222,783, issued Apr. 17, 1917, and the U.S. Pat. No. of C.L. Mattison, 1,710,097, issued Apr. 23, 1929. Apparently because the two Mattison patents are mostly concerned with how to mount the cutters on the cylinder, rather than how to mount the cylinders on the arbor, they do not disclose the latter. However, the means conventionally used for mounting T-slot cylinders on arbors is shown in the U.S. Pat. No. of Ensign 1,072,930, issued Sep. 9, 1913.

In the conventional set-up, the T-slot cylinder has two one-half inch set screw holes tapped into the same one face of the cylinder between a corner where the respective face intersects an adjacent face, and the T-slot in the respective face. The set screw holes are typically located three-quarters of an inch in from the respective ends of the cylinder.

If a lathe arbor is substantially true and a conventional T-slot cylinder 3, with its set screws loosened, is slid onto the arbor, and the arbor is slowly rotated while a conventional eccentricity-measuring gauge is operated against the arbor, the gauge typically will show that the arbor is rotating within two thousandths of an inch of true. However, as the two set screws are tightened as is necessary for locking the cylinder in place on the arbor, and the arbor is slowly turned again, with the conventional measuring device operating, it is typical for an out of balance condition of two to fifteen thousandths of an inch (most typically 5-6 thousandths of an inch) to be indicated. In general, the longer the cylinder, the worse the problem.

SUMMARY OF THE INVENTION

A multi-faceted T-slot cylinder for a cutterhead is mounted to a wood lathe arbor using set screws installed in tapped holes which are provided near opposite ends of the cylinder in diametrically opposite faces of the cylinder (rather than in the same face, as is conventional). Static balancing of the cylinder is thereby improved. For fine-tuning, a dynamic balancing collar is mounted on the arbor near the cylinder. This collar has a plurality of tapped holes provided radially therethrough around its circumference. As the arbor is turned slowly, if measurement shows eccentricity in rotation, the high side is determined and a set screw tightened against the arbor in the respective tapped hole. This dynamic balancing can be done before or after the cutterhead is installed on the arbor, and the dynamic balancer can be used in combination with a wholly conventional T-slot cylinder.

The principles of the invention will be further discussed with reference to the drawings wherein preferred embodiments are shown. The specifics illustrated in the drawings are intended to exemplify, rather than limit, the aspects of the invention as defined in the claims.

BRIEF DESCRIPTION OF THE DRAWINGS

In The Drawings:

FIG. 6 is a fragmentary longitudinal sectional view of an arbor having a T-slot cylinder and a dynamic balancer, both provided in accordance with the invention, mounted thereon.

DETAILED DESCRIPTION

Figure 1:
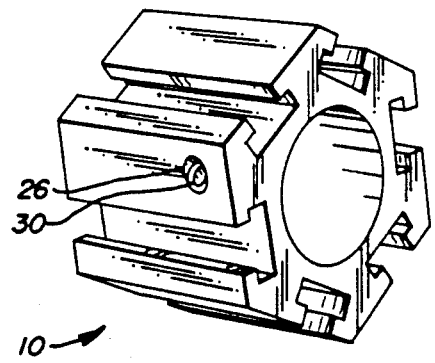
FIG. 1 is a perspective view of a T-slot cylinder constructed in accordance with principles of the present invention.
Figure 3:
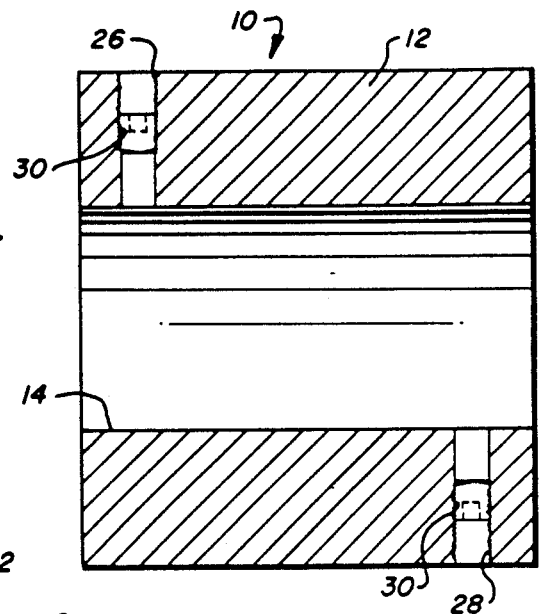
FIG. 3 is a longitudinal sectional view thereof.
Figure 2:
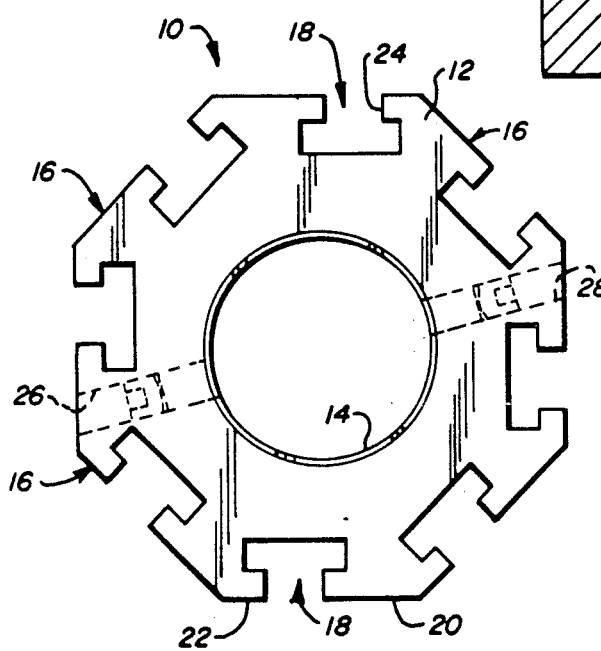
FIG. 2 is an end view thereof.

The T-slot cylinder 10 shown in FIGS. 1-3 and 6 is utterly conventional, as to dimensions material and intended use, except for the location of one of the set screw holes for the two set screws used to mount the T-slot cylinder to an utterly conventional arbor. Accordingly, the T-slot cylinder 10 will not be described in great detail. (Further details may be found in the three above-enumerated prior U.S. Pat. Nos.).

Suffice it to state here, that the T-slot cylinder 10 is an integral tubular cylindrical body 12 having a central throughbore 14 (typically 2.6255 inches in diameter to fit a standard arbor, chamfered to 2.6265 inches in diameter at the opposite ends). Typically, the cylinder 10 is two to fourteen inches long, and has an even number of faces 16 (at least four, most typically six or eight). The diametric face-to-face width dimension of a cylinder 10 typically is 5.9063 inches. Each face of the cylinder is provided, from end to end, with a like T-slot 18. Typically, each T-slot is rotationally offset from the longitudinal medial line of the respective face, a typical offset being as depicted. Accordingly, each face presents the appearance of two bands, namely, a broader one 20 and a narrower one 22 on rotationally opposite sides of the mouth 24 of the respective slot 18.

Near one end, for example, 0.75 inch in from one end, one broad band 20 of one face 16 of the cylinder 10 is provided with a tapped hole 26 (for example, a ¼"-13" tapped hole) aligned on a radius of the cylinder. A diametrically opposite face, correspondingly in from an opposite end, has its broad band likewise provided with a tapped hole 28.

Each of these tapped holes receives a conventional set screw 30.

Referring to FIG. 6, the cylinder 10 is mounted to an arbor 32 by sliding it onto the arbor to the desired axial position, then tightening both set screws 30.

Surprisingly, by providing the set screw holes 26 and 28 on opposite faces of the T-slot cylinder, rather than conventionally on the same side, stress tending to cause lack of static balance is cut from the typical 2–15 thousandths of an inch, to less than two thousandths of an inch. As a result, set-up time may be reduced from the typical 4–6 hours, to one-half hour, and overlap problems are substantially reduced. With all knives on the resulting cutterhead cutting more equally, the cutterhead typically lasts longer.

The cylinder 10 may be a newly-manufactured part, or it may be what was a wholly conventional cylinder, which has simply had a new set screw hole 28 tapped therein diametrically opposite its second (and now unused) set screw hole 26.

Figure 4:
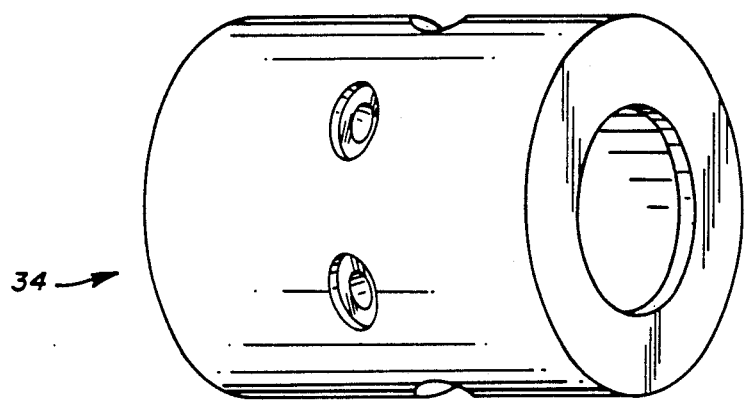
FIG. 4 is a perspective view of a dynamic balance constructed in accordance with principles of the present invention.
Figure 5:
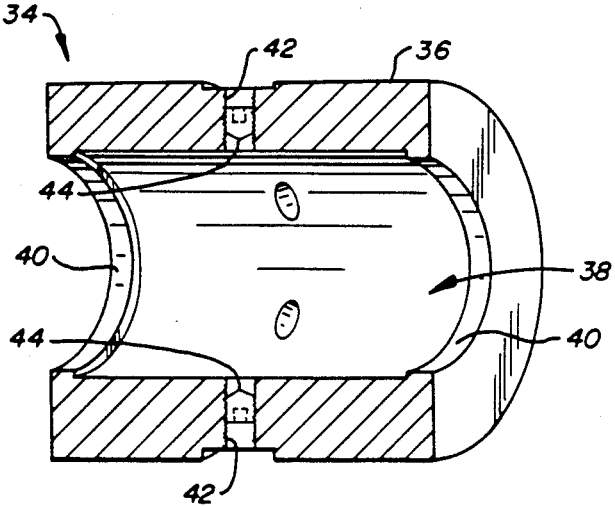
FIG. 5 is a perspective view of a longitudinal section of the dynamic balancer.

A dynamic balancer 34 provided in accordance with teachings of the present invention is shown in FIGS. 4–06.

The dynamic balancer 34 can be used with a cylinder 10 of the present invention, or with a conventional T-slot cylinder. That is, it may be used for bringing an arbor into true before any cylinder is mounted on it, and/or it may be used for "fine-tuning" of balance after a cutterhead has been built using the cylinder 10 or a conventional T-slot cylinder. It can be installed on the set-up stand in a tool room prior to assembly of the holders and knives, so that the cutterhead is built with the arbor true, eliminating the need to have the lathe out of production while a lengthy balancing procedure is conducted. An increase in production of turned parts of 30 to 40 per cent can result from use of the dynamic balancer 34, particularly when its use facilitates repeated installation of the tooling, which has been balanced in the tool room, rather than on the lathe.

The balancer 34 in the preferred embodiment, is a unitary tubular cylindrical unital part 36. It may be made of the same type of steel as is conventionally used for making T-slot cylinders. In the example, the collar 36 is six inches long and five inches in diameter. Its longitudinal bore 38 is 2.75 inches in diameter, except for 0.25 inch long annular lands 40 at its opposite ends, which are 2.6255 inch in diameter (all to fit a conventional arbor, for example, for a Mattison No. 57-F lathe).

Halfway between its ends, the collar 36 is shown provided on respective radial lines, with a plurality (for example, six) equiangularly spaced tapped holes 42, for example, ¼"-13" holes countersync 1¼"×⅜" deep. The holes are provided with set screws 44.

In use, the dynamic balancer 34 is slid onto the arbor to a site axially adjacent a T-slot cylinder location, and the arbor is slowly rotated until the location of the outside of the bow in the arbor (that is, the high side) is determined. The set screw 44 corresponding to the high side of the arbor is then tightened fixing the dynamic balancer to the arbor in a counterbalancing relation to the eccentricity of the arbor.

It should now be apparent that the BALANCING OF TOOLING FOR A WOOD LATHE as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all modifications as are within the spirit and scope of the following claims.

What is claimed is:

1. Apparatus for balancing tooling for a wood lathe, comprising:

a T-slot cylinder having a throughbore for longitudinally receiving an arbor of a wood lathe;

said cylinder having a series of at least four angularly adjacent faces arranged in diametrically opposite pairs, extending about the outer periphery thereof, each said face extending from end to end on said cylinder and having a T-slot formed therein for removable securement of at least one knife holder therein, each said face thereby being divided into two bands on rotationally opposite side of a mouth of a respective said T-slot;

a pair of tapped holes provided along respective radii of said cylinder, one each through two diametrically opposite ones of said faces, respectively near opposite ends of said cylinder; and a respective first threaded fastener threadedly received in each said tapped hole for protruding into said throughbore for securing the cylinder to an arbor;

an arbor;

said T-slot cylinder being received on said arbor at an axially intermediate site thereon;

said first threaded fasteners securing said cylinder on said arbor;

said arbor having an eccentricity so as to have a bow extending in one radial direction;

a dynamic balancer comprising a tubular cylindrical collar having a longitudinal throughbore longitudinally receiving said arbor;

said collar being disposed adjacent one said end of said cylinder;

at a location intermediate two opposite ends of said collar, said collar being provided with a plurality of radially directed, equiangularly spaced tapped holes intersecting said throughbore of said collar;

a second threaded fastener threadedly received in a selected one of said tapped holes in said collar and tightened against said arbor for rotationally, transversely and axially fixing said collar on said arbor, said selected one of said tapped holes in said collar being one confronting said bow in said arbor, whereby said second threaded fastener, upon being tightened against said arbor, tends to counteract said eccentricity.

2. The apparatus of claim 1, wherein:

said throughbore of said collar is smaller in diameter in two lands adjacent said opposite ends of said collar to provide a snug sliding fit on said arbor before said threaded fastener of said collar is tightened against said arbor, and slightly larger in diameter axially between said lands.

* * * * *